United States Patent
Paszkowicz

(10) Patent No.: US 9,669,840 B2
(45) Date of Patent: Jun. 6, 2017

(54) CONTROL SYSTEM AND METHOD

(71) Applicant: Jaguar Land Rover Limited, Coventry (GB)

(72) Inventor: Sebastian Paszkowicz, Coventry (GB)

(73) Assignee: Jaguar Land Rover Limited, Whitley (GB)

( * ) Notice: Subject to any disclaimer, the term of this patent is extended or adjusted under 35 U.S.C. 154(b) by 49 days.

(21) Appl. No.: 14/387,382

(22) PCT Filed: Mar. 20, 2013

(86) PCT No.: PCT/EP2013/055790
§ 371 (c)(1),
(2) Date: Sep. 23, 2014

(87) PCT Pub. No.: WO2013/139841
PCT Pub. Date: Sep. 26, 2013

(65) Prior Publication Data
US 2015/0051752 A1    Feb. 19, 2015

(30) Foreign Application Priority Data
Mar. 23, 2012    (GB) .................................. 1205159.5

(51) Int. Cl.
*B60W 40/08*    (2012.01)
*B60W 50/08*    (2012.01)

(52) U.S. Cl.
CPC ............ *B60W 40/08* (2013.01); *B60W 50/08* (2013.01); *B60K 2350/1096* (2013.01)

(58) Field of Classification Search
CPC .................. B60W 40/08; B60W 50/08; B60K 2350/1096
See application file for complete search history.

(56) References Cited

U.S. PATENT DOCUMENTS

2004/0037236 A1    2/2004    Massey et al.
2004/0088084 A1    5/2004    Geisler et al.
(Continued)

FOREIGN PATENT DOCUMENTS

DE    10 2005 0561175 A1    4/2007
EP    1 512 584 A1    9/2005
(Continued)

OTHER PUBLICATIONS

Office Action Summary, Japanese Patent Application No. 2015-502212, Oct. 13, 2015, 6 pages.
(Continued)

*Primary Examiner* — Aaron L Troost
(74) *Attorney, Agent, or Firm* — Myers Bigel, P.A.

(57) ABSTRACT

The present invention relates to a method and system of controlling the output of information to a driver. It provides to monitor at least one operating parameter of a vehicle and to estimate driver workload is estimated based on said at least one operating parameter, using a plurality of thresholds (HIGH, MEDIUM, LOW) defining driver workload ratings. Output of information to the driver is controlled based on the estimated driver workload rating. To ensure that also low priority information is outputted, the invention provides to periodically cycling through some or all of those defined driver workload ratings having a lower rating than the current estimated workload rating.

15 Claims, 5 Drawing Sheets

(56) References Cited

U.S. PATENT DOCUMENTS

| | | |
|---|---|---|
| 2004/0088205 A1 | 5/2004 | Geisler et al. |
| 2004/0252027 A1 | 12/2004 | Torkkola et al. |
| 2005/0234617 A1 | 10/2005 | Kynast et al. |
| 2007/0219672 A1* | 9/2007 | Fehr .................... B60W 40/08 701/1 |
| 2010/0188304 A1* | 7/2010 | Clymer ................ H01Q 1/185 343/753 |
| 2013/0179505 A1* | 7/2013 | Cardona ............ H04L 49/9031 709/204 |

FOREIGN PATENT DOCUMENTS

| | | |
|---|---|---|
| EP | 2 138 988 A1 | 12/2009 |
| JP | 2006-193044 | 7/2006 |
| WO | WO 2005/055046 A1 | 6/2005 |
| WO | WO 2012/015403 A1 | 2/2012 |

OTHER PUBLICATIONS

International Search Report, PCT/EP2013/055790, Jun. 24, 2013, 5 pages.
Combined Search and Examination Report, Application No. GB1205159.5, Jul. 19, 2012, 8 pages.
Remboski et al., "Driver Performance Improvement Through the Driver Advocate: A Research Initiative toward Automotive Safety," Society of Automotive Engineers Publication, Nov. 1, 2000, pp. 1-10.

* cited by examiner

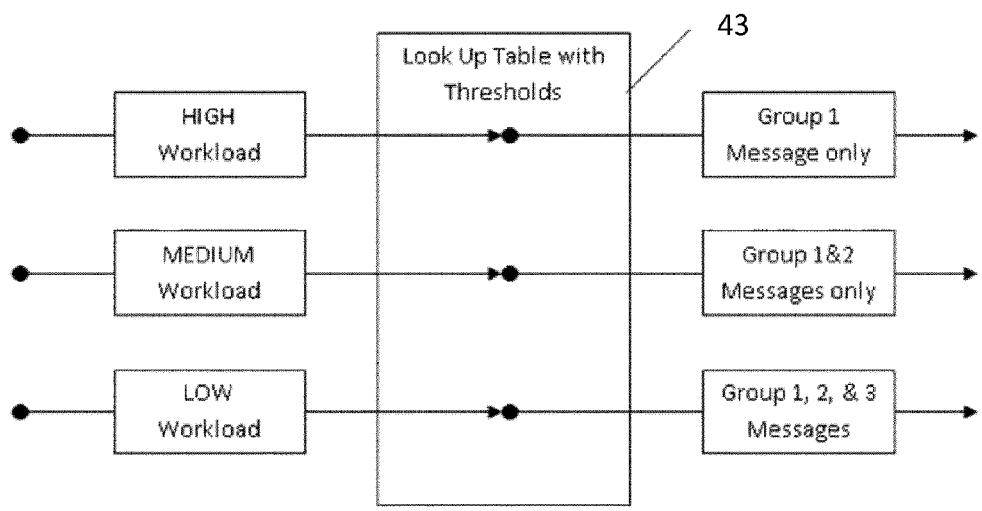
FIG. 2: Illustration of LookUp table behaviour
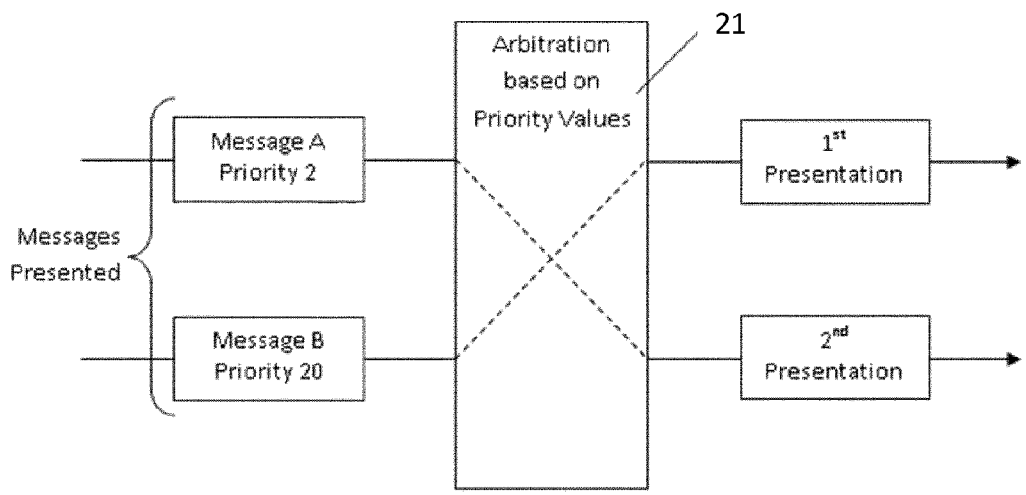
FIG. 3: P-Value Arbitration Example

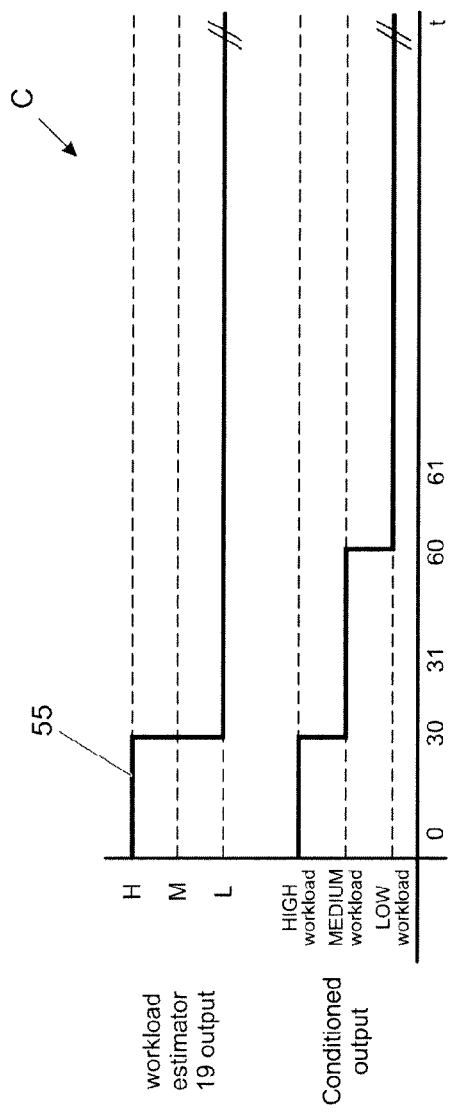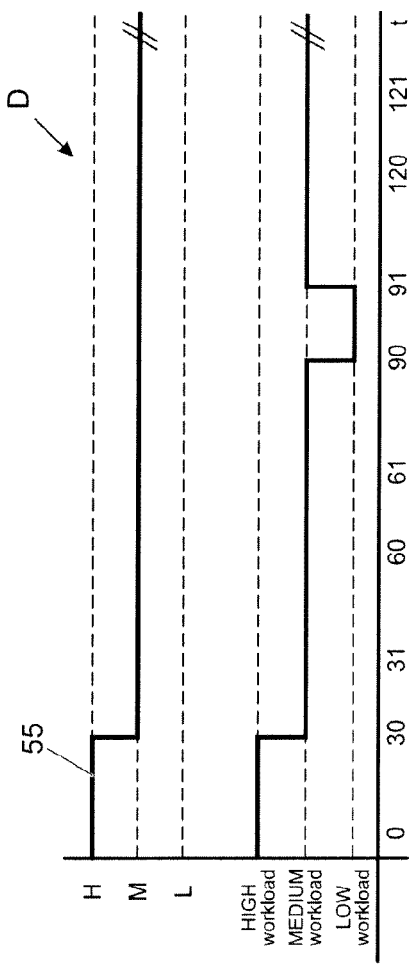

US 9,669,840 B2

CONTROL SYSTEM AND METHOD

RELATED APPLICATIONS

This application is a 35 U.S.C. §371 national stage application of PCT Application No. PCT/EP2013/055790, filed on Mar. 20, 2013, which claims priority from Great Britain Patent Application No. 1205159.5, filed Mar. 23, 2012, the contents of which are incorporated herein by reference in their entireties. The above-referenced PCT International Application was published in the English language as International Publication No. WO 2013/139841 A1 on Sep. 26, 2013.

TECHNICAL FIELD

The present invention relates to a method and system for monitoring a driver workload. The invention also relates to a method and system for controlling the output of information to a driver. Aspects of the invention relate to a vehicle, to a system, to a method and to a computer system.

BACKGROUND OF THE INVENTION

A driver of a vehicle has a varying workload depending on a variety of factors, including traffic, speed, weather and road conditions, etc. The driving task requires the driver to perform several tasks simultaneously to operate the vehicle. Additional tasks can increase the demands on the driver to the point where an additional task may result in overload which may reduce overall performance.

It is known to monitor the physiological parameters of the driver to determine driver alertness. However, measuring physiological parameters alone does not directly assess the workload on the driver. A situation could arise whereby, although the driver is alert, their workload is excessive and their performance is impaired. The provision of Advanced Driver Assistance Features (ADAS) and In-Vehicle Information System (IVIS), such as Personal Nomadic Devices (PND), can further increase the workload on the driver.

It is against this background that the present invention has been conceived. Embodiments of the invention may provide a method, a system, a vehicle or a computer program which improves over the prior art arrangements. Other aims and advantages of the invention will become apparent from the following description, claims and drawings.

SUMMARY OF THE INVENTION

Aspects of the invention provide a method, a system, a vehicle, or a computer system as claimed in the appended claims.

In a further aspect of the present invention for which protection is sought, there is provided a
method of controlling the output of information to a driver, the method comprising:
monitoring at least one operating parameter of a vehicle;
estimating a driver workload based on said at least one operating parameter; and
controlling the output of information to the driver based on the estimated driver workload;
wherein the driver workload is estimated with reference to a plurality of thresholds which define a plurality of driver workload ratings; the method comprising periodically cycling through some or all of said defined driver workload ratings having a lower rating than a current estimated workload rating.

The estimated workload may provide a real-time estimate of a driver workload as they drive a vehicle. If there is a continued increase on the driver demand, the point may be reached where an additional task may result in overload and therefore reduce overall performance. The method according to the present invention can help to avoid this scenario by controlling the output of information to the driver based on the estimated driver workload. The method can thereby control the type of information output to the driver at a time when the driver workload is estimated as being high. The workload control system can form part of a workload management system.

An activity level of one or more vehicle systems can be determined by monitoring said at least one operating parameter. The driver workload could be estimated based on the activity level of said one or more vehicle systems. The estimated driver workload could be based on an absolute count of the vehicle system(s) which is/are currently active. Alternatively, the estimated driver workload can be based on a resource allocation (e.g. a weighting or bias) associated with each vehicle system. The driver workload can be estimated with reference to a nominal baseline. The method can estimate that the driver workload is high when it is above said baseline; and that the driver workload is low when it is below said baseline.

The at least one operating parameter could indicate whether or not a vehicle system is active. Alternatively, or in addition, the at least one operating parameter can specify an operating range of said one or more vehicle systems. The operating parameter can indicate a current operating mode of said one or more vehicle system(s). For example, the operating parameter could indicate which transmission gear is currently engaged. The operating parameter could be a measurement relating to dynamic operation of the vehicle, for example the vehicle speed, longitudinal acceleration or lateral acceleration. Equally, the operating parameter could be a driver input, for example a brake request, a throttle request, a parking brake status, a selected transmission gear, etc.

The driver workload may be estimated with reference to a plurality of thresholds. The thresholds may define a plurality of driver workload ratings. For example, the driver workload ratings can categorise the driver workload as being HIGH, MEDIUM or LOW. The thresholds can relate to the determined activity level of one or more of said vehicle systems.

The information output to the driver can relate to the current estimated driver workload. The method may comprise the further step of periodically cycling through some or all of said defined driver workload ratings. This cycling process can help to avoid lower priority information being withheld indefinitely. The method may comprise cycling through driver workload ratings having a lower rating than the current workload rating.

An algorithm or criterion can be implemented to define said driver workload ratings in relation to said at least one operating parameter. The algorithm can define combinations of said operating parameters which relate to particular driver workload ratings.

The output of information to the driver can comprise the presentation of one or more messages. Each message can have an associated priority indicator for sequencing the presentation of a plurality of said messages. In the event that two or more messages are scheduled for presentation at the same time, the message having the higher priority indicator will be output. A counter could be provided to sequence messages of the same priority based on the order in which they occur.

Controlling the output of information to the driver can comprise controlling the timing of the presentation of said one or more messages. For example, the frequency with which the messages are presented could be altered depending on the estimated driver workload. The frequency could be reduced (i.e. an increased time interval between messages) if the estimated workload is high; and increased (i.e. a reduced time interval between messages) if the estimated workload is low.

The output of information can be performed by an output device providing one or more of the following output formats: audio, haptic or visual. Controlling the output of information to the driver can include controlling the output format of said one or more messages. The output format could be selected based on the estimated driver workload.

The at least one operating parameter can relate to an operating frequency and/or magnitude of one or more associated vehicle systems. For example, an operating parameter for a vehicle braking system could be based on the frequency of operation of the brakes and/or the magnitude of a driver brake request signal.

The at least one operating parameter could be monitored by receiving data from one or more sensors in the vehicle. The one or more sensors could measure dynamic operating parameters of the vehicle, such as acceleration, speed and/or braking. For example, the method could comprise measuring lateral acceleration of the vehicle. The driver workload could be estimated based on the data from said one or more sensors. Controlling the output of information to the driver based on dynamic operating parameters is believed to be patentable independently.

In a further aspect, there is provided a method of controlling the output of information to a driver, the method comprising:
measuring at least one dynamic operating parameter of a vehicle; and
controlling the output of information to the driver based on said at least one dynamic operating parameter. The output of information can be inhibited if said at least one measured dynamic operating parameter exceeds a pre-defined threshold. The method can comprise the step of estimating a driver workload based on said at least one dynamic operating parameter.

In another aspect, the invention relates to a method of monitoring at least one operating parameter to determine an activity level of one or more vehicle systems; and estimating a driver workload based on the activity level of said one or more vehicle systems.

In a further aspect, the present invention relates to a workload monitoring system comprising a workload estimator configured to estimate a driver workload based on at least one operating parameter of the vehicle; a control module configured to define one or more workload ratings and to control the output of information to the driver based on the estimated driver workload; wherein the workload monitoring system comprises a conditioning module configured to cycle through some or all of said workload ratings having a lower rating than a current estimated workload rating.

The workload monitoring system can be configured to monitor said at least one operating parameter to determine an activity level of one or more vehicle systems. The workload monitoring system can include an activity monitor configured to determine an activity level of one or more vehicle systems based on said at least one operating parameter.

The activity level can be related to an operating frequency and/or magnitude of said one or more vehicle systems. The workload monitoring system can be configured to monitor an operating frequency and/or operating magnitude of one or more vehicle systems.

The control module may be configured to define one or more workload ratings, for example HIGH, MEDIUM or LOW. The conditioning module may be configured to cycle through some or all of said workload ratings.

The workload monitoring system can further comprise a storage device containing priority indicators for sequencing the output of said information. A scheduler can be provided, for example to buffer information to be output.

The workload monitoring system could also be configured to utilise at last one dynamic operating parameter of the vehicle to control the output of information. The workload estimator could estimate the driver workload based on said at least one dynamic operating parameter. The at least one dynamic operating parameter could be received from one or more sensors in the vehicle. Using at least one dynamic operating parameter to control the output of information to the driver is believed to be patentable independently.

In a still further aspect, the present invention relates to a control system for controlling the output of information to the driver based on at least one dynamic operating parameter of a vehicle. The control system can be operatively coupled to one or more sensors for measuring dynamic operating parameters of the vehicle. The control system can be further configured to estimate a driver workload based on said at least one dynamic operating parameter.

In a yet further aspect, the present invention relates to a workload monitoring system comprising a workload estimator configured to estimate a driver workload based on at least one operating parameter of the vehicle.

In a further aspect, the invention relates to a vehicle comprising a workload monitoring system as described herein.

The method(s) described herein can be machine-implemented. The method described herein can be implemented on a computational device comprising one or more processors, such as an electronic microprocessor. The processor(s) can be configured to perform computational instructions stored in memory or in a storage device. The device described herein can comprise one or more processors configured to perform computational instructions.

In a further aspect the present invention relates to a computer system comprising: programmable circuitry; and software encoded on at least one computer-readable medium to program the programmable circuitry to implement the method described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which:

FIG. 2 shows a lookup table for estimating the driver workload;

FIG. 3 illustrates arbitration for sequencing the presentation of messages based on the estimated workload;

FIGS. 4A-4D show step-down cycle maps for cycling between the estimated workloads;

DETAILED DESCRIPTION OF AN EMBODIMENT

Figure 1:
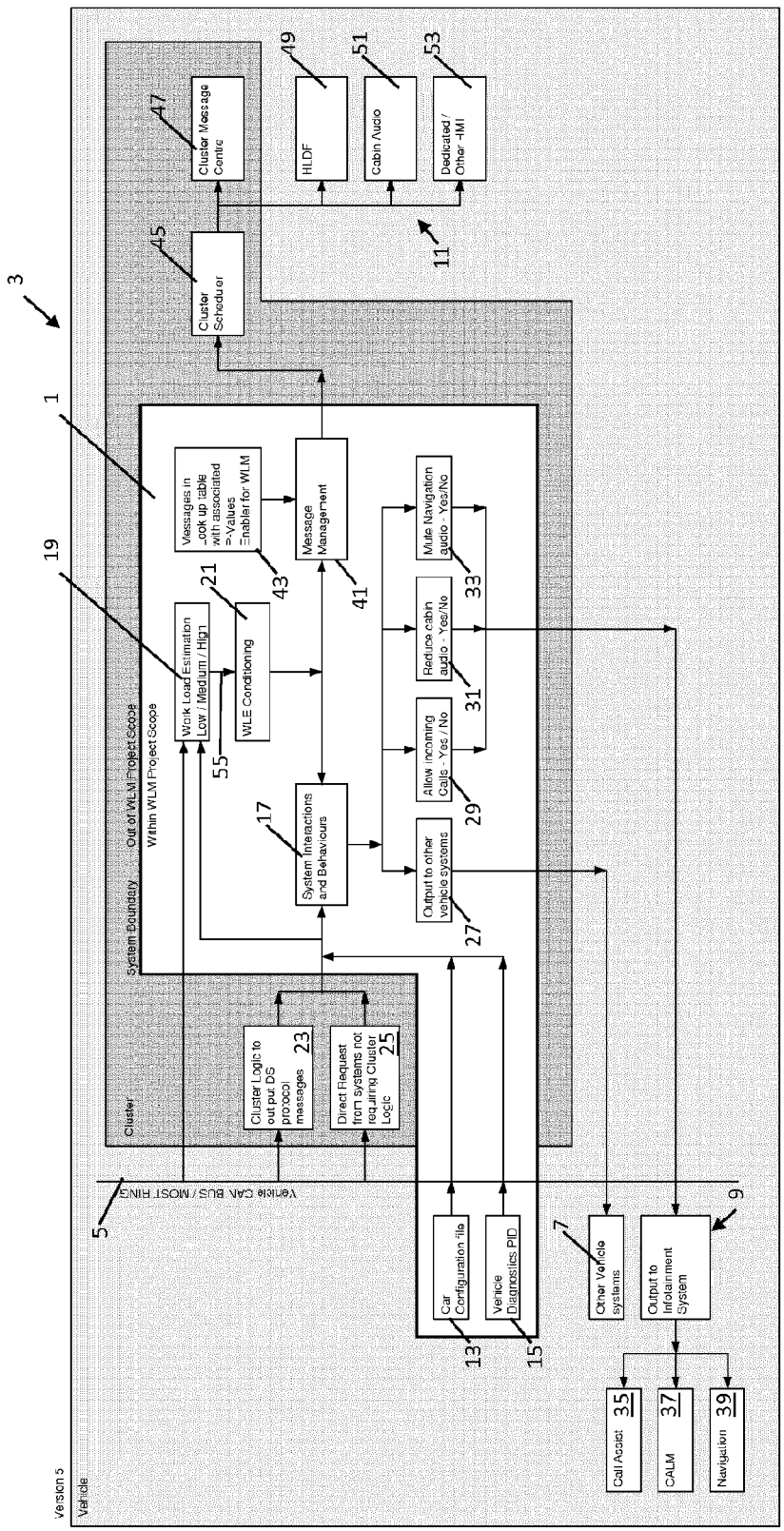
FIG. 1 shows a schematic representation of a workload monitoring system in accordance with an embodiment of the present invention.

A flow chart of the workload monitoring system 1 for a motor vehicle (not shown) according to the present invention is illustrated in FIG. 1. The workload monitoring system 1 is configured to estimate the workload of the driver based on vehicle operating parameters and to control the output of information to the driver accordingly.

The workload monitoring system 1 is integrated into a vehicle control system 3 which is coupled to a vehicle controller area network (CAN) bus 5. The workload monitoring system 1 is connected to system outputs, including a vehicle system output 7, an infotainment system 9 and human machine interfaces (HMI) 11. The workload monitoring system 1 comprises a car configuration file 13, a vehicle diagnostics module 15, a system interaction and behaviours module 17, a workload estimator 19 and a workload conditioning module 21.

The car configuration file 13 and the vehicle diagnostics module 15 provide inputs for the system interactions and behaviours module 17 and the workload estimator 19. The vehicle CAN bus 5 also transmits vehicle operating parameters directly to the workload estimator 19. The systems interactions and behaviours module 17 outputs system control signals to a vehicle systems module 27, a communication module 29, a cabin audio system 31 and a navigation system 33. The vehicle systems module 27 is connected to the vehicle system output 7. The communication module 29, the cabin audio system 31 and the navigation system 33 are connected to the infotainment system 9 which comprises a call assist module 35, a critical audio level monitoring module (CALM) 37 and a navigation module 39.

The workload monitoring system 1 further comprises a message management module 41 which is connected to a message look-up table 43. The message management module 41 controls the output of messages to an instrument cluster scheduler 45 provided in the vehicle control system 3. The instrument cluster scheduler 45 is connected to an instrument cluster message centre 47 and also the human machine interfaces 11, which include a touchscreen 49, a cabin audio module 51 and one or more dedicated user interfaces 53.

Workload Estimation

The workload estimator 19 is configured to estimate the remaining capacity of the driver to deal with an additional resource demand. The workload estimator 19 enables rules and logic held within the message look-up table 43 to be reactive to the workload state of the driver based on vehicle operating parameters. As illustrated in FIG. 2 and described in more detail below, the workload estimator 19 uses the vehicle operating parameters to classify a current driver workload as one of the following:

LOW workload—the driver is in a state where they have sufficient remaining capacity to accommodate additional information. The base line would be controlling a vehicle at 'normal' speeds in a straight line.

MEDIUM workload—the driver is in a heightened state and may have less capacity to accommodate additional information at that moment in time.

HIGH workload—the driver is involved in a task that requires significantly more attention than driving in a straight line and their capacity for accommodating additional information is much reduced.

A driver workload signal 55 indicative of the estimated driver workload (i.e. LOW, MEDIUM or HIGH) is output to the workload conditioning module 21 and then to the systems interactions and behaviours module 17 and the message management module 41. The message management module 41 determines which system messages should be presented to the user based on the estimated workload. The operation of the workload estimator 19 and the message management module 41 will now be described.

The workload estimator 19 monitors the vehicle operating parameters to determine the operating state of a plurality of vehicle systems. The vehicle operating parameters each have a signal range representative of different operating states. For example, the vehicle operating parameters associated with the drive transmission can indicate that the transmission is currently operating in Park, Reverse, Neutral, Drive, 4th, 3rd, Low Range or undefined. Furthermore, the vehicle systems are each classified as either single or multiple event triggers for the MEDIUM and HIGH driver workloads. The workload estimator 19 determines the driver workload based on the classification of the currently active vehicle system(s).

The workload estimator 19 estimates a LOW driver workload when neither the HIGH driver workload nor MEDIUM driver workload is applicable. In addition, when certain predefined vehicle operating systems are active, the workload estimator 19 is forced to a LOW driver workload.

The workload estimator 19 estimates a MEDIUM driver workload when either: (a) more than one vehicle systems classified as a medium workload multiple event trigger is active (so-called Dual Mode Medium); or (b) one or more vehicle systems classified as a medium workload single event trigger is active (so-called Single Mode Medium). The workload estimator 19 can apply a criterion (or algorithm) requiring that the Dual Mode Medium is triggered only when a predefined combination of medium workload event triggers is active.

The workload estimator 19 estimates a HIGH driver workload when either: (a) more than one vehicle systems classified as a high workload multiple event trigger is active (so-called Dual Mode High); or (b) one or more vehicle systems classified as a high workload single event trigger is active (so-called Single Mode High). The workload estimator 19 can apply a criterion (or algorithm) requiring that the Dual Mode High is triggered only when a predefined combination of high workload multiple event triggers is active.

Message Classification

The presentation of messages is based on the workload estimated by the workload estimator 19. Specifically, the availability of different groups of messages is defined within the message look-up table 43. The different groups of messages are separated by thresholds, dependant on the given output of the workload estimator 19 at any given moment in time. In the present embodiment, the messages are classified in three groups: Group 1, Group 2 and Group 3. (It will be appreciated that more than three classification groups could be utilised.) A summary of exemplary messages allocated to each group in accordance with the present embodiment is as follows:

Group 1 messages comprise one or more of the following: legally required; manufacturer mandated messages; warning level alerts; active messages; feedback messages; service messages; messages that cannot be buffered; and justified exceptions to Group 2 and/or 3.

Group 2 messages comprise one or more of the following: advisory level alerts; messages that can be delayed for up to 30 seconds; and justified exceptions to Group 1 and/or 3.

Group 3 messages comprise one or more of the following: messages that can be delayed for more than 60 seconds; and justified exceptions to Group 1 and/or 2.

The messages classified in Group 1 have the highest priority and can be presented irrespective of the estimated workload (i.e. they are output when the estimated workload is LOW, MEDIUM or HIGH). The messages classified in Group 2 have an intermediate priority and can be presented only when the estimated workload is not HIGH (i.e. they are output when the estimated workload is either LOW or MEDIUM). The messages classified in Group 3 have the lowest priority and can be presented only when the estimated workload is LOW (i.e. they are not output when the estimated workload is MEDIUM or HIGH).

The messages within each group are allocated a priority value (P-Value) to determine the sequence with which candidate messages are presented. The priority values are stored in the message look-up table 43 and are interpreted by the message management module 41 to arbitrate between multiple simultaneous messages. The application of a priority value to each message enables the presentation of messages to be managed based on their priority. Moreover, the presentation of messages can be dynamically managed based on supplementary information from the workload estimator 19. By way of example, the sequencing of messages having different priorities for presentation is illustrated in FIG. 3. The priority value for a first message A is less than that of a second message B and the message management module 41 sequences the second message B for presentation before the first message A.

Workload Conditioning

The workload conditioning module 21 is provided to maintain a temporal separation between messages. As outlined above, the message lookup table 43 arranges messages into three groups (Group 1, Group 2 and Group 3) which are available for presentation depending on the estimated workload (HIGH, MEDIUM or LOW). Notably, a refractory period is introduced to buffer between the presentation of active information (such as safety and/or collision systems) and lower priority information (such as non-safety systems).

In order to maintain the temporal message separation, a step-down cycle map is implemented temporally to separate the presentation of messages from the different message groups defined in the message look-up table 43. The step-down cycle map artificially holds periods of MEDIUM and LOW workload (i.e. irrespective of the workload signal 55 from the workload estimator 19). Moreover, the HIGH workload will be output only if a HIGH workload input is present.

Figure 4A:
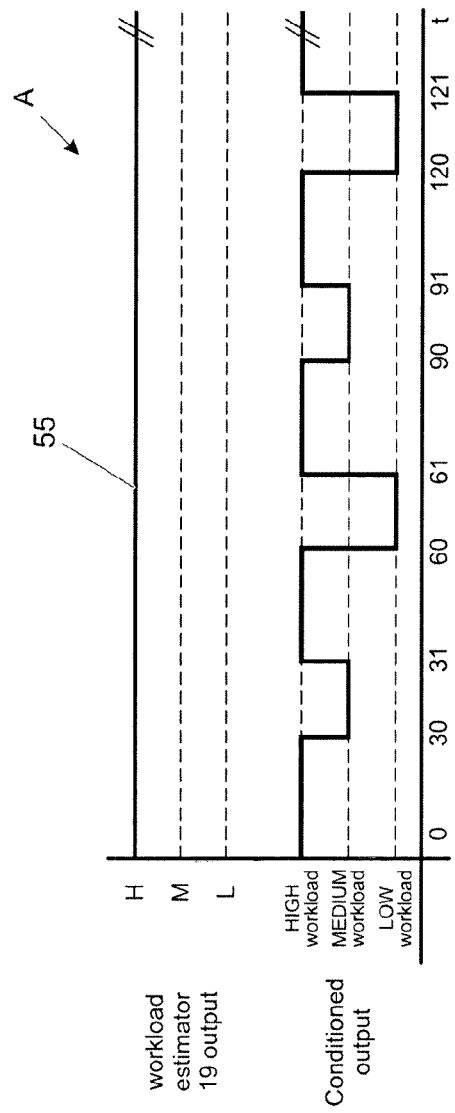

A first step-down cycle map A is shown in FIG. 4A for a long term HIGH workload. When the workload estimator 19 is outputting a HIGH workload signal 55 for a prolonged period, the workload conditioner module 21 will output a signal for HIGH workload. Thirty (30) seconds from the onset of HIGH workload from the workload estimator 19 (if there has been no change) the conditioner module 21 will condition the signal to MEDIUM workload for one (1) second, following this every sixty (60) second cycle (provided that the workload estimator 19 output remains on HIGH workload) the conditioned output will be MEDIUM workload for a period of one (1) second. Sixty (60) seconds from the onset of the HIGH workload from the workload estimator 19 (if there has been no change) the signal will be conditioned to LOW workload for one (1) second. After this (provided that the workload estimator 19 output remains at HIGH workload) the condition output will be HIGH workload, following this every sixty (60) second cycle (provided that the workload estimator 19 output remains on HIGH workload) the conditioned output will be LOW workload for a period of one (1) second.

Figure 4B:
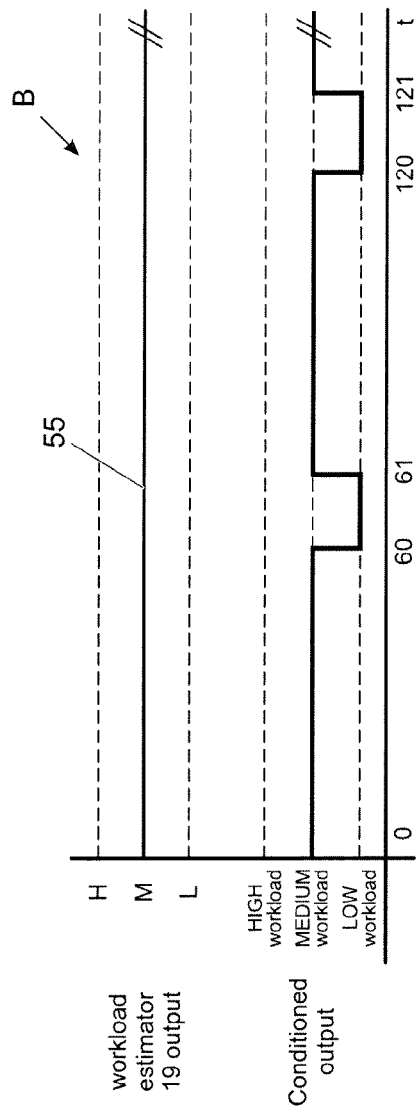

A second step-down cycle map B for a long term MEDIUM workload is illustrated in FIG. 4B. When the workload estimator 19 is outputting MEDIUM workload for a prolonged period, sixty (60) seconds from the onset of the MEDIUM workload from the workload estimator 19 (if there has been no change) the signal will be conditioned to LOW workload for one (1) second. After this (provided that the workload estimator 19 output remains at MEDIUM workload) the condition output will be MEDIUM workload, following this every sixty (60) second cycle (provided that the workload estimator 19 output remains on MEDIUM workload) the conditioned output will be LOW workload for a period of one (1) second.

When the workload estimator 19 is outputting long term LOW workload, the conditioned output from the workload conditioning module 21 will mirror the workload estimator 19 condition.

The workload conditioning module 21 also introduces a transition phase for changes from a HIGH workload to a LOW workload. As illustrated in a third step-down cycle map C shown in FIG. 4C, when the workload estimator 19 output changes from HIGH workload to LOW workload, the conditioned output will be MEDIUM workload for 30 seconds then LOW workload.

When the output of the workload estimator 19 changes from HIGH workload to MEDIUM workload, the conditioned output from the workload conditioning module 21 changes to a MEDIUM workload. As illustrated in a fourth step-down cycle D in FIG. 4D, the sixty (60) second MEDIUM workload cycle of signal conditioning is maintained.

The time periods specified for switching between the different workload states in each of the step-down cycles described herein can be modified or calibrated, as required. For example, the time periods can be altered for different systems.

Message Presentation

As part of optimising the cabin environment, the workload monitoring system 1 can control the volume of the cabin audio in response to the estimated workload. The system interactions and behaviours module 17 outputs a control signal to the cabin audio system 31. It is proposed that three (3) levels of cabin audio muting depending on the type/number of systems presenting audio feedback. The cabin audio is reduced (attenuated) when a warning alert (e.g. critical oil level) is output; or when a system with audio HMI is active (e.g. a forward alert warning can output an alert chime and the cabin audio is muted for the duration of the audio alert). Equally, the cabin audio can be partially or completely muted when two or more systems with audio components are presenting a message (e.g. when a collision warning system and a parking aid are presenting audible alerts).

The monitoring of the cabin audio is a decision that is defined by the workload monitoring system 1. The workload monitoring system 1 determines whether to reduce the volume of the cabin audio by a small amount, by a large amount or to completely mute (100%) the cabin audio. For every message presented by the cluster scheduler 45 there is an audio muting attribute in the look up table 43 that stipulates the level of audio muting associated with any given message. For system messages that are not generated within the instrument cluster it will be necessary to output a specific cabin audio level request for a given CAN signal. A separate look-up table could be provided for cross referencing against CAN messages.

By way of example, there are certain conditions under which the presentation of an audio instruction from a navigation aid is undesirable. The system interactions and behaviours module 17 outputs a control signal to the navigation system 33 to enable/disable the presentation of audio instructions. The presentation of audio instructions could, for example, be inhibited when the driver is attempting a parking manoeuvre using a park assist feature. If a parking aid is actively presenting information to the driver about an object that is in close proximity, then the presentation of information from the parking aid should take priority over any audible navigation messages.

The workload monitoring system 1 can also determine whether incoming telephone calls should be transferred directly to the driver or if they should be managed. Specifically, the workload manager 1 can manage incoming telephone calls if the workload estimator 19 has estimated a HIGH workload. The output from the system is a CAN message to the Bluetooth® Phone.

EXAMPLES

The operation of the workload estimator 19 will now be described with reference to a series of examples.
LOW Workload LOW workload is defined as the period when Medium and High Workload are not true. This enables LOW workload to be the default state of the system.

There is provision to force the workload estimator 19 to output a LOW workload signal. For example, when the transmission is in PARK mode, the workload is set to LOW. If the driver has selected Park then they are indicating that there is no intention to move the vehicle—it is believed therefore that this would be an appropriate opportunity to force the output of the workload estimator 19 to LOW workload. The electronic parking brake (EPB)/handbrake is not considered as part of the provision to force the workload to LOW because a driver may choose to apply the handbrake at a junction while still in a drive gear.
MEDIUM Workload MEDIUM workload is an escalated level of workload based upon the state of a number of monitored vehicle parameters. MEDIUM workload is estimated based upon a number of single event triggers (Single Mode Medium) and also as a result of the combination of a number of parameters satisfying a criterion (Dual Mode Medium). None of these events alone can trigger a HIGH workload although when three (3) or more MEDIUM workload events are true then a HIGH workload state is estimated. The MEDIUM workload states are explained in greater detail in the following sections:

The MEDIUM workload block takes into account whether or not the forced LOW workload is active and whether or not HIGH workload is being estimated. It is only possible to estimate MEDIUM workload when LOW workload is not forced, and HIGH workload is not being estimated since these supersede the MEDIUM workload state.
Single Event (MEDIUM Workload)

There are a number of single trigger events that can result in an estimated MEDIUM workload output from the workload estimator 19, these are detailed below:

Cruise Over Ride—When the driver depresses the accelerator pedal while cruise control is active then there is a Cruise Over Ride event. During this period Medium Workload is estimated as this is a conscious decision of the driver to override an automated system.

Cruise Cancel—When the driver presses the cruise cancel button (steering wheel) or depressed the brake pedal whilst in cruise control then Medium Workload is estimated—this is a conscious decision of the driver to override an automated system.

Indicator Status—When the indicator is active Medium Workload is estimated. The use of indicators signals the driver's intention to perform a manoeuvre and as such workload is at an increased level. This trigger will have a time out period after which Medium Workload will no longer be estimated, even if the indicator on state persists. The time out period can be calibrated.

Reverse Selected—When reverse gear is selected Medium Workload is estimated. The use of reverse gear signifies that the driver is performing a complex manoeuvre. It is necessary to include a timer for the gear state to prevent the estimated workload from changing as a result of the driver shifting from Park to Drive, or Drive to Park through Reverse momentarily.

Vehicle Advisory (Amber') Alert—When advisory alert is presented to the driver, there is likely to be a system state or event that requires the driver's attention by the very essence that an advisory alert has been deemed credible to be presented. When an advisory alert is presented to the driver then Medium Workload is estimated by the workload estimator 19.

Windscreen Wash Wipe—When a wash request is made for the windscreen then Medium workload should be set. Given that this action may result in temporary reduce forwards vision it is appropriate to set Medium Workload.
Multiple Event (MEDIUM Workload)

There are several multiple trigger events that can result in an estimated MEDIUM workload output from the workload estimator 19, these are detailed below:

Tailgate Open & Vehicle Moving—When the vehicle senses that the tailgate is open and vehicle speed >0 kph then Medium Workload is estimated. Driving with the tailgate open can be a deliberate or unintentional action. Therefore after a period of time Medium Workload will no longer be estimated even though the state may persist. The time out period can be calibrated.

Wipers & Lights Active—When the vehicle windscreen wipers AND headlights are both active then Medium Workload is estimated. It is anticipated that when these parameters are met, the vehicle is in an environment where driver workload is increased, and therefore Medium Workload should be estimated. The wiper speed could be calibrated for this event, for example intermittent, constant, constant high speed.

Accumulation to High—When the workload estimator 19 is estimating three (3) or more MEDIUM workload events then HIGH Workload is estimated. The value for the total number of MEDIUM workload events to shift to a HIGH Workload can be adjusted.

HIGH Workload

HIGH Workload is the most significant level of workload. HIGH workload is estimated based upon a number of single event triggers (Single Mode High) and also as a result of the combination of a number of parameters satisfying a criterion (Dual Mode High).

Single Mode (HIGH Workload)

There are a number of single trigger events that can result in an estimated High Workload output, these are detailed below:

Vehicle Warning ('Red') Alert—When a warning alert is presented to the driver then HIGH Workload is estimated by the workload estimator 19. When a warning alert is presented to the driver, there is likely to be a system state or event that requires the driver's attention by the very essence that a warning alert has been deemed credible to be presented.

"Driver Intervene" Message—The "Driver Intervene" message is presented by systems utilising the forward looking radar to control certain vehicle functions on behalf of the driver. When systems trigger the "driver intervene" message, it is because they are no longer able to control the vehicle functions within predetermined parameters, and control is handed back to the driver. At this point it is believed that workload will increase and therefore it is appropriate to estimate HIGH workload. The "Driver Intervene" message is a short duration (approx 4 seconds) temporary alert. HIGH workload should then continue to be output for a short period after the alert, but this time period can be calibrated.

Accelerator kick down detected—Accelerator kick down is a deliberate driver action and input to the vehicle demanding maximum acceleration from the vehicle. Kick-down is not a feature of normal driving and is expected to be triggered in scenarios when the driver consciously depresses the accelerator pedal fully. During periods of maximum vehicle acceleration potential, HIGH workload is estimated.

Gear State and Speed—It may be possible to shift into an inappropriate gear while travelling at speed. If this occurs, the workload estimator 19 estimates a HIGH workload.

Steering Wheel Angle Speed—Steering wheel angle speed, is a measure of the rate of change of steering wheel angle as input by the driver. Under normal driving conditions the rate of change of steering angle input from the driver is low, however when completing complex manoeuvres or when aggressive steering inputs are required this can significantly increase the steering wheel angle rate of change. Therefore HIGH workload is estimated when the steering wheel angle speed is calculated to be above a given threshold.

Intelligent Emergency Brake (IEB)—When the IEB system determines that an intervention is credible and sets a pre-charge level, then the workload estimator 19 will estimate HIGH workload.

Dynamic Stability Control (DSC)—When the DSC system determines that an intervention is credible, the workload estimator 19 will estimate HIGH workload.

Advanced Reversing Aid (ARA) (aka Cross Traffic Alert (CTA)) event—When the ARA system determines that an alert is credible, the workload estimator 19 will estimate HIGH workload.

Electronic Traction Control (ETC)—When the ETC system determines that an intervention is credible, the workload estimator 19 will estimate HIGH workload.

Hill Decent Control (HDC)—When the HDC system is taking action, the workload estimator 19 will estimate HIGH workload.

Telephone Call—When the (Bluetooth®) communication system is in a call then the workload estimator 19 will estimate HIGH workload.

Legal Message—When a legally required message is presented to the driver then HIGH workload is estimated by the workload estimator 19. When a legally required message is presented to the driver there is likely to be a system state or event that requires the driver's attention by the very essence that it is deemed to be legally required to be presented.

Active System Error—When an active system is presenting an error message to the driver then HIGH workload is estimated by the workload estimator 19. Given that when an active system presents a message to the driver there is likely to be a system state or event that requires the driver's attention by the very essence that an active system is displaying an output.

Windscreen Wipers on Fast Mode—When wipers are set to Fast Wipe then this is estimated as HIGH workload. Given that this action may be due to extreme weather conditions that would reduce visibility it is appropriate to set HIGH workload.

Multiple Mode (HIGH Workload)

In addition to the single mode high events, a combination of a number of parameters satisfying a criterion Dual Mode High have also been specified. The workload estimator 19 applies one or more Boolean operators. If these operators are satisfied, the workload estimator 19 estimates a HIGH workload. Examples of these multiple mode (HIGH workload) scenarios are detailed below:

Seatbelt Unbuckle—When a seatbelt that was buckled becomes unbuckled the system will estimate HIGH workload. It is anticipated that the unbuckling of a seatbelt whilst the vehicle is in motion is an undesirable state, and the driver is likely to want to take remedial action. HIGH workload will be estimated when vehicle speed >0 kph AND a seatbelt unbuckle event is triggered. This trigger will have a time out period after which HIGH workload will no longer be estimated, even if the state persists. The time-out period can be calibrated.

Anti-Lock Brake System (ABS) Braking Event—The ABS Braking dual mode event is a combination of an ABS event AND a driver braking demand. Should the ABS system decide that intervention is credible and there is a brake demand then the vehicle has a high skid potential. Accordingly, the workload estimator 19 estimates HIGH workload.

ABS Frequency—The ABS Frequency dual event is the result of a number of ABS events being detected in a short period of time. A high ABS frequency can be an indicator of driving off-road or on hostile terrain and he workload estimator 19 estimates HIGH workload. It is possible to calibrate both the number of ABS events required and time period for the calculation.

Blind Corner—The "Blind Corner" dual mode event is a combination of the steering wheel angle AND brake pressure demand. When steering wheel angle exceeds a threshold and brake pressure demand exceeds a threshold then a HIGH workload event is triggered. It is anticipated that when these parameters are met, in this given combination, the vehicle is likely to be in a situation where the driver is attempting to negotiate a complex turning and therefore the workload estimator 19 estimates a HIGH workload. It is possible to calibrate both the steering wheel angle and brake pressure demand thresholds.

Blind Spot Monitor (BSM)—The BSM and Advanced Blind Spot Monitor (ABSM) systems detect the presence of a vehicle in the blind spot or a rapidly approaching vehicle in the adjacent lane respectively. When this system determines that it is credible to present an alert to the driver AND the driver has initiated the vehicle indicators in the corresponding direction (threat from left and indicating left OR threat from right and indicating right) then the workload estimator 19 estimates HIGH workload.

Figure 5:
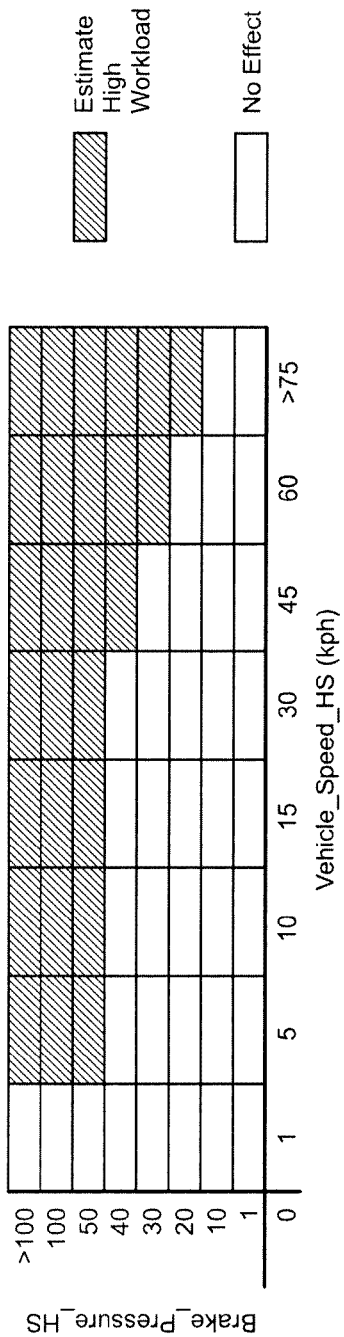
FIG. 5 shows a map of brake pressure against vehicle speed for estimating workload.

Brake Demand Map—A Brake Demand Map dual mode event has been developed with brake pressure relative to speed determining the estimation of HIGH workload. The current embodiment of the brake map provides brake pressure which is inversely proportional to speed in order to trigger a HIGH workload, as illustrated in Table 1 in FIG. 5. The brake map defines the threshold values at which HIGH workload is estimated (illustrated as shaded cells). The Brake Demand Map could be modified also to define threshold values at which MEDIUM workload is estimated.

Figure 6:
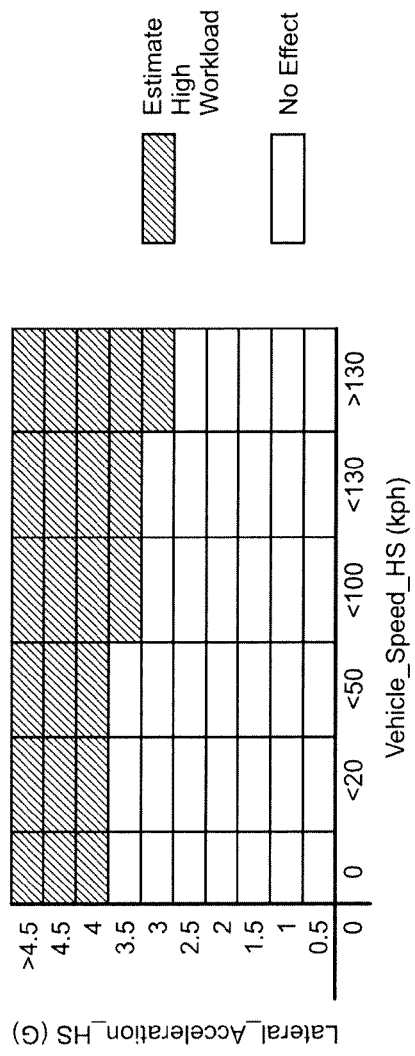
FIG. 6 shows a map of lateral acceleration against vehicle speed for estimating workload.

Vehicle Lateral Acceleration and Speed—Vehicle lateral acceleration is a measure of the forced being experience by the vehicle in the lateral plane. When these forces increase it is as a direct result of behaviour of the vehicle. The lateral forces experienced as also a function of vehicle speed and the driver's demand to corner. As illustrated in Table 2 in FIG. 6, a map of lateral acceleration and speed will be used to determine when the workload estimator estimates a HIGH workload (illustrated as shaded cells). The map can be calibrated. The Vehicle Lateral Acceleration and Speed Map could be modified also to define threshold values at which MEDIUM workload is estimated.

Door Ajar—The door ajar dual mode event is a combination of the detection of vehicle doors (with the exception of the Tailgate) NOT being shut AND vehicle speed >0 kph. Driving with a door open is considered to be an unintentional action and remedial action is required, therefore HIGH workload is estimated by the workload estimator 19.

Incline—The incline dual mode event is a combination of vehicle speed AND inclination of the vehicle (as determined by the EPB longitudinal accelerometer) to have exceeded a threshold. It is anticipated that when these parameters are met, in this combination, the vehicle is likely to be in a situation where the driver is attempting a complex off-road manoeuvre and maximum concentration is required. The threshold values could be calibrated for different vehicles.

Articulation—The articulation dual mode event is a combination of vehicle speed AND vehicle articulation as determined by the air suspension system to have exceeded a threshold. It is anticipated that when these parameters are met, in this given combination, the vehicle is likely to be in a situation where the driver is attempting a complex off-road manoeuvre and maximum concentration is required. The threshold values could be calibrated for different vehicles.

Junction—The Junction dual mode event is a combination of indicator active OR brake pedal activation. This event is held for the duration of the indicator active event after the brake pedal has been released OR until the steering angle is neutral for a period of time greater than a predetermined number of seconds. It is anticipated that when these parameters are met, the vehicle is entering a complex junction. The event hold function is to compensate for manoeuvres in a junction e.g. negotiating a roundabout.

Lane Change—The lane change dual mode event is a combination of indicator active AND throttle demand greater than a predetermined threshold. It is anticipated that when these parameters are met, the vehicle is performing a complex manoeuvre.

Parking Aid Combined—The parking aid combined mode event is a combination of any parking aid trigger (for example detection of an object) AND the vehicle being in reverse gear. It is anticipated that when these parameters are met, the driver is performing a complex manoeuvre. It is necessary to include a timer for the gear state to prevent the estimated workload from changing as a result of the driver shifting from Park to Drive, or Drive to Park through Reverse momentarily.

Trailer Reversing—The Trailer Reversing dual mode event is a combination of detecting that a trailer is connected AND that the vehicle is in reverse gear. It is anticipated that when these parameters are met, the driver is performing a complex manoeuvre. It is necessary to include a timer for the gear state to prevent the estimated workload from changing as a result of the driver shifting from Park to Drive, or Drive to Park through Reverse momentarily.

Narrow Street—The Narrow Street dual mode event is a combination of detecting lateral distance to an object (using the semi-autonomous long range side ultrasonic sensor) AND vehicle speed. It is anticipated that when these parameters are met, the driver is performing a complex manoeuvre in close proximity to other objects.

Accelerator Lift Off—Accelerator Lift Off dual mode event is a combination of detecting a rapid accelerator pedal lift off AND vehicle travelling at significant speed. It is anticipated that when these parameters are met, the driver is travelling at speed and has quickly taken their foot off the accelerator anticipating the need to reduce speed or possibly initiate braking due a change in conditions on the road ahead.

Hold High—Following the end of a HIGH workload triggering event, the HIGH workload state is artificially maintained for a further two (2) seconds (the time period can be calibrated). Trigger events for HIGH workload can be relatively short in duration e.g. Forward Collision Alert provides a three (3) second alert to the driver, this period although sufficient for the provision of an alert to the driver is not a long enough for the driver to complete any remedial action required as a result of the event. Therefore, the ability for the workload estimator to hold the HIGH workload state for a further period of time provides the driver with a refractory period to recover from the triggering event.

It will be appreciated that various changes and modifications can be made to the embodiment described herein without departing from the spirit and scope of the present invention. Further aspects of the present invention are set out in the following numbered paragraphs:

1. A method of controlling the output of information to a driver, the method comprising:
   monitoring at least one operating parameter of a vehicle;
   estimating a driver workload based on said at least one operating parameter; and controlling the output of information to said driver based on the estimated driver workload;
   wherein the driver workload is estimated with reference to a plurality of thresholds which define a plurality of driver workload ratings; the method comprising periodically cycling through some or all of said defined driver workload ratings having a lower rating than a current estimated workload rating.

2. A method described in paragraph 1, wherein said at least one operating parameter specifies an operational status or an operating range of one or more associated vehicle systems.

3. A method described in paragraph 1, wherein the output of information comprises the presentation of one or more messages.

4. A method described in paragraph 3, wherein each message has an associated priority indicator for sequencing the presentation of a plurality of said messages.

5. A method described in paragraph 1, wherein controlling the output of information to the driver comprises controlling the timing of the presentation of said one or more messages; and/or controlling the output format of said one or more messages.

6. A method described in paragraph 1, wherein the step of monitoring said at least one operating parameter comprises determining an operating frequency and/or operating magnitude of one or more vehicle systems.

7. A method described in paragraph 1, wherein the step of monitoring said at least one operating parameter comprises measuring at least one dynamic operating parameter of the vehicle.

8. A workload monitoring system for a vehicle, the workload monitoring system comprising a workload estimator configured to estimate a driver workload based on at least one operating parameter of the vehicle; a control module configured to define one or more workload ratings and to control the output of information to a driver based on the estimated driver workload; wherein the workload monitoring system comprises a conditioning module configured to cycle through some or all of said workload ratings having a lower rating than a current estimated workload rating.

9. A workload monitoring system as described in paragraph 8, wherein the workload monitoring system is configured to monitor said at least one operating parameter to determine an activity level of one or more vehicle systems.

10. A workload monitoring system described in paragraph 8, wherein the workload monitoring system is configured to monitor an operating frequency and/or operating magnitude of one or more vehicle systems.

11. A workload monitoring system described in paragraph 8 further comprising a storage device containing priority indicators for sequencing the output of said information.

12. A workload monitoring system described in paragraph 8, wherein the workload estimator is configured to estimate a driver workload based on at least one dynamic operating parameter of the vehicle.

13. A vehicle comprising a workload monitoring system described in paragraph 8.

14. A computer system comprising: programmable circuitry; and software encoded on at least one computer-readable medium to program the programmable circuitry to implement the method described in paragraph 1.

The invention claimed is:

1. A method of controlling the output of information to a driver of a vehicle, the method comprising the following steps performed by a control system of the vehicle:
monitoring, via a workload estimator module of the control system, at least one operating parameter of the vehicle, wherein the at least one operating parameter specifies an operational status or an operating range of one or more associated vehicle systems;
estimating, via the workload estimator module, a driver workload based on the at least one operating parameter;
controlling output of information to the driver, via a message management module of the control system, based on the estimated driver workload, wherein the driver workload is estimated with reference to a plurality of thresholds which define a plurality of driver workload ratings;
presenting, via at least one output device of the vehicle, one or more messages to the driver based on a current driver workload rating, wherein the at least one output device comprises at least one of an audio output device, a haptic output device, and a visual output device; and
periodically changing the current workload rating, via a conditioning module of the control system, to one or more of the workload ratings having a lower rating than the current workload rating, irrespective of the current estimated driver workload.

2. The method of claim 1, wherein each message has an associated priority indicator for sequencing the presentation of a plurality of the messages.

3. The method of claim 1, wherein controlling the output of information to the driver comprises controlling a timing of presenting the one or more messages, and/or controlling an output format of the one or more messages.

4. The method of claim 1, wherein the step of monitoring the at least one operating parameter of the vehicle comprises determining an operating frequency and/or operating magnitude of the one or more vehicle systems.

5. The method of claim 1, wherein the step of monitoring at least one operating parameter of the vehicle comprises measuring at least one dynamic operating parameter of the one or more vehicle systems.

6. The method of claim 5, wherein the at least one dynamic operating parameter of the vehicle is one of acceleration of the vehicle, speed of the vehicle and braking of the vehicle.

7. A workload monitoring system for a vehicle, the workload monitoring system comprising:
a workload estimator configured to estimate a driver workload based on at least one operating parameter of the vehicle, wherein the at least one operating parameter specifies an operational status or an operating range of one or more associated vehicle systems;
a control module configured to define one or more workload ratings and to control output of information to a driver based on the estimated driver workload by outputting information corresponding to a current workload rating to the driver via at least one output device of the vehicle, wherein the at least one output device comprises at least one of an audio output device, a haptic output device, and a visual output device; and
a conditioning module configured to periodically change the current workload rating to one or more of the workload ratings having a lower rating than the current workload rating, irrespective of the current estimated driver workload.

8. The workload monitoring system of claim 7, wherein the workload monitoring system is configured to monitor the at least one operating parameter to determine an activity level of the one or more vehicle systems.

9. The workload monitoring system of claim 7, wherein the workload monitoring system is configured to monitor an operating frequency and/or operating magnitude of the one or more vehicle systems.

10. The workload monitoring system of claim 7, further comprising a storage device containing priority indicators for sequencing output of the information.

11. The workload monitoring system of claim 7, wherein the workload estimator is configured to estimate a driver workload based on at least one dynamic operating parameter of the vehicle.

12. The workload monitoring system of claim 11, wherein the at least one dynamic operating parameter of the vehicle is one of acceleration of the vehicle, speed of the vehicle and braking of the vehicle.

13. A vehicle, comprising
at least one output device, wherein the at least one output device comprises at least one of an audio output device, a haptic output device, and a visual output device; and
a workload monitoring system, the system comprising:
  a workload estimator configured to estimate a driver workload based on at least one operating parameter of the vehicle, wherein the at least one operating parameter specifies an operational status or an operating range of one or more associated vehicle systems;
  a control module configured to define one or more workload ratings and to control output of information to a driver based on the estimated driver workload by outputting information corresponding to a current workload rating to the driver via the at least one output device; and
  a conditioning module configured to periodically change the current workload rating to one or more of the workload ratings having a lower rating than the current workload rating, irrespective of the current estimated driver workload.

14. A computer system, comprising:
programmable circuitry; and
software encoded on at least one non-transitory computer-readable medium to program the programmable circuitry to implement a method of controlling the output of information to a driver, the method comprising:
  monitoring at least one operating parameter of a vehicle, wherein the at least one operating parameter specifies an operational status or an operating range of one or more associated vehicle systems;
  estimating a driver workload based on the at least one operating parameter;
  controlling output of information to the driver based on the estimated driver workload, wherein the driver workload is estimated with reference to a plurality of thresholds which define a plurality of driver workload ratings;
  outputting information corresponding to a current workload rating; and
  periodically changing the current workload rating to one or more of the workload ratings having a lower rating than the current workload rating, irrespective of the current estimated driver workload.

15. A vehicle, comprising:
at least one sensor configured to measure at least one operating parameter of the vehicle, wherein the at least one operating parameter specifies an operational status or an operating range of one or more associated vehicle systems;
at least one output device, wherein the at least one output device comprises at least one of an audio output device, a haptic output device, and a visual output device; and
a processor configured to:
  receive data from the at least one sensor;
  estimate a driver workload based on the data received from the at least one sensor regarding the at least one operating parameter;
  control output of information to a driver of the vehicle based on the estimated driver workload, wherein the driver workload is estimated with reference to a plurality of thresholds which define a plurality of driver workload ratings;
  output information corresponding to a current workload rating to the driver via the at least one output device; and
  periodically change the current workload rating to one or more of the workload ratings having a lower rating than the current workload rating, irrespective of the current estimated driver workload.

* * * * *